United States Patent Office 3,053,833
Patented Sept. 11, 1962

---

3,053,833
NOVEL SULFANILYLAMINOPYRIDAZINE DERIVATIVES AND PROCESS FOR PREPARING THE SAME
Takenari Nakagome, Koshiencho, Nishinomiya-shi, and Toshiaki Komatsu, Minoo-shi, Japan, assignors to Sumitomo Chemical Company, Ltd., Osaka, Japan, a corporation of Japan
No Drawing. Filed May 22, 1961, Ser. No. 111,860
Claims priority, application Japan May 28, 1960
2 Claims. (Cl. 260—239.7)

This invention relates to novel sulfanilylaminopyridazine derivatives and a process for preparing the same. More particularly this invention relates to 3,6-di(lower alkoxy)-4-sulfanilylaminopyridazines and a process for preparing the same.

It is one object of the present invention to provide novel sulfanilylaminopyridazine derivatives which are extremely valuable as chemotherapeutic agent due to its high antibacterial activity. Another object of the present invention is to provide a novel process for preparing the sulfanilylaminopyridazines. Further objects will be apparent from the description which follows.

The novel sulfanilylaminopyridazines of the present invention are represented by the general formula

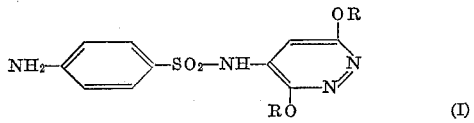

wherein R is a lower alkyl radical. These compounds can be obtained by reaction of a 3,6-di(lower alkoxy)-4-aminopyridazine of the general formula

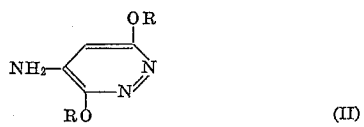

with a p-acylamino-benzenesulfonyl halide to form 3,6-di(lower alkoxy)-4-(p-acylaminobenzenesulfonyl)aminopyridazine of the general formula

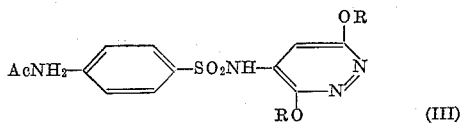

which is followed by hydrolysis.

Among the compounds of the above-indicated general Formula II which can be used for the preparation of the compounds of the present invention, 3,6-dimethoxy-4-aminopyridazine was described in Journal of the Pharmaceutical Society of Japan, Vol. 75, page 966 (1955) and reported at the 13th Annual Meeting of the Pharmaceutical Society of Japan by Itai et al. They proposed a method for obtaining 3,6-dimethoxy-4-aminopyridazine, by catalytic reduction of 3,6-dimethoxy-4-nitropyridazine-1-oxide in acetic anhydride as solvent with hydrogen in the presence of a palladium catalyst to form 3,6-dimethoxy-4-acetylaminopyridazine which is then subjected to hydrolysis with an aqueous alkali solution.

On the other hand, we have found that 3,6-di(lower alkoxy)-4-nitropyridazine-1-oxide can generally be converted into the corresponding 3,6-di(lower alkoxy)-4-aminopyridazine in a simple manner without using such an expensive solvent and catalyst as acetic anhydride and palladium, respectively. For the purpose of the catalytic reduction of 3,6-di(lower alkoxy)-4-nitropyridazine-1-oxide, any of known reduction catalysts may be employed, but generally speaking, Raney nickel is most preferable in the commercial scale production. Suitable solvents are lower alcohols, and particularly a mixture of a lower alcohol and a small amount of acetic acid. After the completion of such reduction reaction as proposed by us, the resulting reaction mixture contains desired compound of the general Formula II in its pure state or the byproduct-free state and, hence, this mixture may be directly used in the subsequent step.

In accordance with the process of the present invention, a 3,6-di(lower alkoxy)-4-aminopyridazine, which may be obtained by the above-mentioned process or by any of other known processes, is reacted with a p-acylaminobenzenesulfonyl halide. Reaction conditions employed are substantially similar to those which are employed for the preparation of known sulfanilylamide compounds, e.g. sulfanilylaminodiazine, sulfanilylaminoisoxazole. In the most preferred embodiment, both of the above-indicated reactants in approximately equimolar ratio are reacted at a temperature of from room temperature, i.e. 15° C., to 100° C., more preferably from 25° to 60° C., in the presence or absence of a solvent. The reaction which takes place herein is shown by the following equation:

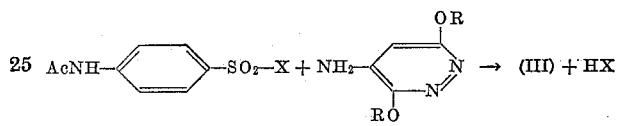

where R stands for a lower alkyl group and X is a halogen atom. As apparent from the equation, hydrogen halide is by-produced during the reaction, and, therefore, it is particularly recommended to carry out the reaction in the presence of a hydrogen halide-acceptor, such as pyridine, alkali carbonate, alkali bicarbonate, etc. Suitable solvents for the instant reaction include water, methanol, ethanol, propanol, etc. Pyridine also is suitable because it takes a part as solvent and hydrogen halide-acceptor.

Thus formed 3,6-di(lower alkoxy)-4-(p-acylaminobenzenesulfonyl)-aminopyridazine of the general Formula III is heated together with an aqueous or alcoholic solution of a dilute acid or a dilute alkali solution (e.g. 1% to 40% solution) for a short time (e.g. from 10 min. to 5 hours) thereby to give the corresponding 3,6-di-(lower alkoxy) - 4 - (p-aminobenzenesulfonyl)-amino-pyridazine of the general Formula I as the hydrolysis product. The hydrolysis reaction can be advantageously carried out at a temperature of from 90° to 100° C. for a period of from 0.5 to 1.5 hours.

The acyl radical which is attached to protect the p-amino portion of the said acylaminobenzenesulfonyl halide may be formyl, acetyl, propionyl, butyryl, ethoxycarbonyl, benzoyl, etc. The halogen atom which constitutes the sulfonyl halide portion may be chlorine or bromine.

In the general Formulae I, II and III, R may be taken as lower alkyl radical, such as methyl, ethyl, n-propyl, isopropyl, butyl (including isomeric structures), etc. Particularly preferable as the R is methyl radical.

Thus obtained 3,6-di(lower alkoxy)-4-sulfanilylaminopyridazines are novel compounds. For instance, 3,6-dimethoxy-4-sulfanilylaminopyridazine is a colorless crystalline substance melting at 189–190° C., and it is easily soluble in dilute mineral acid and in alkali bicarbonate solutions and difficultly soluble in benzene, chloroform and ethyl ether. It is easily soluble in hot alcohol and recrystallizable from alcohol or water.

The sulfanilylaminopyridazine compounds of the present invention are less toxic and are valuable as chemotherapeutic agent, being effective against a variety of pathogenic microorganisms. Thus the present compounds show antibacterial activity persistent longer than that of the heretofore known sulfa drugs. When these compounds are orally administered, the maximum blood concentration is reached within a shorter time, and the inactivation in blood is comparatively lower (i.e. the acetylation in blood is lower). Table I shows the comparative data of the bacteriostatic activity of the present compound and the heretofore known sulfa drugs in vitro.

TABLE I

| Strains tested | Compound of the invention | Minimum growth inhibitory concentration, (μg./cc.) | | |
|---|---|---|---|---|
| | | SI | SDM | SMP |
| Straphylococcus aureus 209 P | 6.25 | 6.25 | 6.25 | 12.5 |
| Escherichia coli O-111 | 12.5 | >200 | 50 | 200 |
| Salmonella typhi No. 58 | 50 | 50 | 50 | 25 |
| Shigella flexneri 2 2A | 3.125 | 3.125 | 3.125 | 6.25 |
| Klebsiella pneumoniae PCI 602 | 200 | >200 | 100 | 100 |
| Streptococcus group A type I | 25 | 25 | 25 | 25 |
| Diplo. pneumoniae type I | 6.25 | 6.25 | 6.25 | 6.25 |
| B. C. G | 25 | 100 | 100 | 100 |

Table II shows the results for treating streptococcus-affected mice by the oral administration of the compound of the present invention, as well as the heretofore known sulfa drugs. The strain used is streptococcus group A type I. The administration is daily continued for five days. In Table II, $CD_{50}$, $CD_{75}$ and $CW_{95}$ means 50, 75 and 95% curative dose (mg./kg.) respectively.

TABLE II

| Samples tested | $CD_{50}$ | $CD_{75}$ | $CD_{95}$ |
|---|---|---|---|
| Compound of the present invention | 10.6 | 23 | 67 |
| SMP | 9.6 | 36 | 228 |
| SDM | 19.7 | 80 | 610 |
| SP | 97.0 | 310 | >1,000 |
| SIM | 113 | 275 | 680 |
| SI | 190 | 710 | >1,000 |

Table III shows the acute toxicity in the oral administration of the compound of the present invention, as well as the heretofore known sulfa drugs, into mice. In Table III, $LD_{50}$ means 50% lethal dose (g./kg.)

TABLE III

| Samples tested | $LD_{50}$ |
|---|---|
| Compound of the present invention | 2.05 |
| SIM | 2.65 |
| SMP | 1.75 |
| SI | 6.80 |
| SDM | >10 |

In the above-indicated tables, the abbreviation of the samples are as follows:

SI _____ Sulfisoxazole.
SDM _____ Sulfadimethoxine.
SMP _____ Sulfamethoxypyridazine.
SP _____ Sulfaphenazole.
SIM _____ Sulfisomezole.

Now the detailed explanation will be given in conjunction with the following examples.

*Example 1.—3,6-Dimethoxy-4-Aminopyridazine*

Twenty grams of 3,6-dimethoxy-4-nitropyridazine-1-oxide are dissolved in 150 cc. of methanol, and 10 cc. of Raney nickel suspension and 20 cc. of glacial acetic acid are added to the resulting solution. Catalytic reduction with hydrogen is effected at room temperature under atmospheric pressure. Before the completion of the reaction, about 4 moles of hydrogen have been taken up.

The reaction mixture is filtered to remove the Raney nickel catalyst, and thereafter it is distilled under reduced pressure to remove the solvent. The residue has added thereto an aqueous sodium carbonate solution to make it alkaline. The solution is concentrated again under reduced pressure to dryness. The resulting residue is extracted with hot ethyl acetate. The extract is concentrated to dryness. The residue is recrystallized from water, whereby colorless prisms separate out. The crystalline mass is collected by filtration, M.P. 177–178° C. Yield, 15.0 g. (97% on theoretical basis). It does not show any depression in melting point when mixed with the authentic sample of 3,6-dimethoxy-4-aminopyridazine.

*Example 2.—3,6-Dimethoxy-4-Sulfanilylaminopyridazine*

Five grams of 3,6-dimethoxy-4-aminopyridazine are dissolved in 80 cc. of dry pyridine and 8.7 g. (1.1 times of the stoichiometric amount) of p-acetylaminobenzenesulfonyl chloride are added portionwise to the resulting solution, with stirring. After completion of the addition, the resulting mixture is allowed to stand at room temperature for 24 hours. 17 cc. of 2 N. caustic soda solution are added and then the pyridine is distilled off from the mixture under a reduced pressure. To the resulting residue, 40 cc. of 2 N. caustic soda solution are added, and the resulting mixture is boiled under reflux for one hour. After cooling the mixture, charcoal is added and the mixture then filtered. The filtrate is neutralized with dilute hydrochloric acid to form precipitate which is collected by filtration and washed with water. It has M.P. 189–190° C. Yield 5.5 g. By recrystallizing the product from ethanol, colorless short rods are obtained, M.P. 189–190° C. Elementary analysis for $C_{12}H_{14}O_4N_4S$ is as follows:

Calcd.: C, 46.45%; H, 4.55%; N, 18.06%. Found: C, 46.36%; H, 4.31%; N, 17.75%.

What is claimed is:
1. 3,6-di(lower alkoxy)-4-sulfanilylaminopyridazine.
2. 3,6-dimethoxy-4-sulfanilylaminopyridazine.

References Cited in the file of this patent
UNITED STATES PATENTS

| 2,371,115 | Winnek et al. | Mar. 6, 1945 |
| 2,494,524 | Sprague | Jan. 10, 1950 |
| 2,582,147 | Mourer | Jan. 8, 1952 |
| 2,867,565 | Feinstone | Jan. 6, 1959 |
| 2,879,269 | Merian | Mar. 24, 1959 |
| 2,891,953 | Clark et al. | June 23, 1959 |

OTHER REFERENCES

Itai et al.: Chemical Abstracts, Vol. 50, p. 4970 (1956).